UNITED STATES PATENT OFFICE 2,422,437

METHOD OF PREPARING PASTE FOR ELECTRIC STORAGE BATTERY PLATES

William J. Plews, Chicago, Ill., and Bernard Chiego, Newark, N. J.

No Drawing. Application March 3, 1945, Serial No. 580,930

9 Claims. (Cl. 136—27)

This invention relates to electric storage batteries of the lead-sulphuric acid type, and particularly to a method of preparing the plates which constitute the major elements of such batteries.

The pasted or Faure type plates which are commonly used in electric storage batteries are prepared by applying a paste to supports called grids of suitable material such as lead or compositions thereof. The paste is usually prepared by mixing lead oxide with a sulphuric acid solution in the proportions necessary to give the mass a pasty consistency. The sulphuric acid reacts with the lead oxide to produce lead sulphate, and the efficiency of the battery depends upon the uniformity and completeness of this reaction. Owing to the limitation of the amount of liquid which can be added without destroying the pasty character of the mass, it has been necessary to use relatively strong acid ranging in specific gravity from 1.075 to 1.150. Sulphuric acid of this concentration reacts very rapidly with the lead oxide, the resulting lead sulphate having a tendency to form relatively large crystals which make the mass less porous and reduce the efficiency of the plates in the battery.

It is the object of the present invention to provide a simple and effective method of preparing plates for storage batteries including the treatment of the lead oxide with relatively dilute sulphuric acid to produce a smoother and more efficient past with the sulphate content more uniformly dispersed. Moreover, the paste will be free from large sulphate crystals and will contain a higher percentage of the sulphate radical than paste produced by the old procedure heretofore employed.

Another object of the invention is to provide a paste which, because of its porosity, is more efficient and is also capable of filling the spaces in the grids with the minimum weight of material, thus permitting the production of a lighter and cheaper battery having, nevertheless, a high ampere-hour capacity, longer effective life and other advantages.

We have discovered that the paste employed in the manufacture of storage battery plates is prepared more efficiently and economically by utilizing a dilute solution of sulphuric acid having a gravity, for example, of 1.020 to 1.050, the volume of acid being increased beyond that required to produce a paste. The suspension of lead oxide and sulphate resulting from the reaction cannot be used directly as a paste, but upon removal of the excess liquid, for example by filter-pressing the mass, we are able to produce a paste of the proper consistency. Owing to the dilution of the acid, the reaction, although progressing rapidly, results in a uniform dispersion of the sulphate content throughout the mass and produces a material in which the particles remain in an extremely finely divided condition approaching a colloidal suspension. Such material has been found to contain from 20% to 25% of sulphate radical as compared with 3% to 5% in ordinary pastes produced by the usual method. In addition, the bulk of this material is such, owing to its porosity, that five ounces thereof will fill the space usually requiring six ounces of ordinary paste.

Two salient features distinguish this disclosure over the prior art. The first lies in the fact that the method proposed herein makes possible the production of a battery plate paste of extremely fine particles having a higher sulfate content than that found in ordinary pastes produced by the usual method, and, since $PbSO_4$ has a lower density than the other chemical components of the plate, a lighter plate results. The second feature is that the conditions of manufacture set forth herein allow the reaction to proceed at temperatures which will not destroy any of the hydrates of lead which may form in contradistinction to the usual method wherein high concentrations of reactants are mixed with subsequent development of temperatures high enough to militate against the formation of said hydrates whose decomposition temperature is about 145° C.

Both the hydrates and the sulfates formed under the conditions of manufacture set forth herein are white amorphous or micro crystalline powders. As a consequence, the pasting material prepared by our method is lighter in color than that prepared by the usual method and, when pasted onto grids and dried, yields plates which are lighter in weight, thus effecting a saving in lead, and furthermore yields plates which undergo sulfation more rapidly and have greater strength and longer life. Hence, the two factors mentioned represent the basic improvement in the art.

As an example of the invention, we may utilize litharge, PbO or mixtures of litharge with red lead, $Pb_3O_4$. A very efficient mixture includes litharge with approximately 10% of red lead. The lead oxide is mixed in a suitable tank with a relatively dilute solution of sulphuric acid which may vary in gravity from approximately 1.020 to approximately 1.050. The lower gravity is preferred. By way of illustration but not of limitation we may use the following proportions, a mixture of 220 lbs. made up of 90% PbO and 10% $Pb_3O_4$, is stirred into a mixture of 24 lbs. of 98% $H_2SO_4$ mixed with 700 lbs. of water. The volume of acid solution is such as to produce a relatively thin suspension which is unsuitable for pasting. By using a large volume of low gravity acid the speed of the reaction is reduced somewhat, but the presence of sufficient acid is assured so that a considerable conversion of the lead oxide into lead sulphate is obtained.

Moreover, the lead sulphate, as hereinbefore indicated, is maintained in finely divided condition and is thoroughly dispersed in the mass. The treatment may be conducted at ordinary room temperatures, and the reaction is complete in a relatively short time, that is, from five to six minutes usually. At the completion of the reaction the mass is removed from the tank to a filter press or other suitable device adapted to separate the surplus liquid and is thus reduced to the form of a paste having the desired consistency which may vary somewhat, depending upon practice, some workers preferring thinner and others thicker paste. In this step of the process one may use a filter press without forming a hard paste. Our preference is for a continuous method involving preferably the use of an "Oliver" rotary filter in which the degree of vacuum and the speed of rotation control the amount of water removal or the consistency of the paste. We have also accomplished our result by allowing the particles of oxide and sulfate to settle in the tank long enough to drain off the supernatant liquid and leave a magma of the consistency desired. Instead of the "Oliver" type of filter we may use a continuous centrifuge such as the "Bird" type or a modification thereof. The paste thus prepared may be applied to the "grids" in the usual manner, and the latter may be dried either by exposure to the atmosphere in the ordinary manner or preferably by the procedure described in the said patent to Plews. After drying, the plates may be treated in the usual "forming" tanks after which they may be assembled to produce batteries.

Plates prepared as described are more efficient than any heretofore known, because of their extreme porosity and the fineness and dispersion of the lead sulphate therein. Such plates do not accumulate readily the hard patches of sulphate crystals which occur commonly in storage batteries and reduce the effective life and capacity thereof. The plates are cheaper and lighter, and the batteries made therefrom are less expensive.

These and other advantages are secured by the practice of the invention as hereinbefore described, and various changes may be made in the details of the operation and of the structure of the plates without departing from the spirit of our invention or sacrificing the advantages thereof.

What we claim is:

1. The method of preparing electric storage battery plates which comprises treating lead oxide with a solution of sulphuric acid in proportions such as to form a suspension which in that state cannot be used as a paste, removing the surplus liquid to produce a mass of pasty consistency, and then pasting the resulting material on supporting grids.

2. The method of preparing electric storage battery plates which comprises treating lead oxide with a solution of sulphuric acid of a gravity between approximately 1.020 and 1.050 in proportions such as to form a suspension which in that state cannot be used as a paste, removing the surplus liquid to produce a mass of pasty consistency, and then pasting the resulting material on supporting grids.

3. The method of preparing a paste for storage battery plates which comprises treating lead oxide with a solution of sulphuric acid in proportions such as to form a suspension of extremely fine particles and so light that it cannot be used in such state as a paste, then removing the surplus liquid by filtering to produce a mass of pasty consistency.

4. The method of preparing a paste for storage battery plates which comprises treating lead oxide with a solution of sulphuric acid of a gravity between approximately 1.020 and 1.050 in proportions such as to form a suspension of extremely fine particles and which in that state cannot be used as a paste, and then removing the surplus liquid by filtering to produce a mass of pasty consistency.

5. A method of preparing paste for storage battery plates which comprises mixing the oxide or oxides of lead with a relatively weak solution of sulfuric acid in volume to produce a relatively thin suspension of the said oxide or oxides so as to promote the uniform formation, dispersion and stability of the sulfates and hydrates at low mass temperatures below the decomposition temperature for the hydroxides of lead and then removing the surplus liquid by filtering to produce a mass of pasty consistency.

6. A method of preparing a storage battery plate ready for the usual forming process which consists in reacting the oxide or oxides of lead with a dilute sulfuric acid of specific gravity less than 1.0662 (9.66%) and preferably of specific gravity 1.020 (3%) to 1.050 (7.4%), in sufficient amount to yield from 10% to 50% of sulfates and preferably 20% to 25% of sulfates, separating out the solids by filtering and pasting battery plate grids therewith.

7. A method of preparing a storage battery plate which comprises reacting the oxide or oxides of lead with dilute sulfuric acid of specific gravity 1.020 to 1.050 in sufficient amount to yield a suspension from 10% to 25% of sulfate, and at a temperature which will not destroy the hydrates of lead, removing the surplus liquid to produce a paste of the desired consistency, then pasting the plates and treating them with superheated steam to harden said paste.

8. The method of preparing paste for a storage battery plate which consists in mixing litharge and red lead with sulphuric acid of relatively low specific gravity and in volume to produce a thin suspension to assure that a considerable conversion of lead oxide into lead sulfate is obtained, and then removing the surplus liquid by filtering to produce a paste of the desired consistency.

9. The method of obtaining a strong storage battery plate of relatively light weight and long life which consists in mixing lead oxides with relatively dilute sulphuric acid so as to produce a thin paste of finely divided particles having a relatively high sulfate content, then removing by filtering some of the liquid to leave a paste of a desired consistency, then applying the paste to a grid or plate, then drying the plate.

WILLIAM J. PLEWS.
BERNARD CHIEGO.

REFERENCES CITED

The following references are of record in the file of this patent:

UNITED STATES PATENTS

| Number | Name | Date |
|---|---|---|
| 1,629,636 | Plews | May 24, 1927 |
| 471,590 | Winkler | Mar. 29, 1892 |
| 1,572,512 | Benner | Feb. 9, 1926 |
| 1,228,547 | Flanders | June 5, 1917 |
| 1,668,801 | Calbeck | May 8, 1928 |
| 2,202,489 | Hauel | May 28, 1940 |
| 2,249,330 | Stewart | July 15, 1941 |